(12) United States Patent
Xu et al.

(10) Patent No.: US 10,036,626 B2
(45) Date of Patent: Jul. 31, 2018

(54) VEHICLE GUIDANCE SYSTEM, METHOD FOR ORIENTATING VEHICLE, AND INSPECTION VEHICLE

(71) Applicant: NUCTECH COMPANY LIMITED, Beijing (CN)

(72) Inventors: Yanwei Xu, Beijing (CN); Defang Meng, Beijing (CN); Weifeng Yu, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 15/283,115

(22) Filed: Sep. 30, 2016

(65) Prior Publication Data

US 2017/0184392 A1 Jun. 29, 2017

(30) Foreign Application Priority Data

Dec. 29, 2015 (CN) .......................... 2015 1 1004616

(51) Int. Cl.
*G01B 11/00* (2006.01)
*G01B 11/26* (2006.01)
(Continued)

(52) U.S. Cl.
CPC ............ *G01B 11/002* (2013.01); *G01B 11/14* (2013.01); *G01B 11/26* (2013.01); *G05D 1/0236* (2013.01); *G01M 17/007* (2013.01)

(58) Field of Classification Search
CPC ....... G01B 11/002; G01B 11/14; G01B 11/26; G01M 17/007; G05D 1/0236
See application file for complete search history.

(56) References Cited

U.S. PATENT DOCUMENTS 5,020,620 A * 6/1991 Field ....................... G01S 17/06
   180/169
5,367,458 A * 11/1994 Roberts ................. G01C 15/002
   180/169
(Continued)

FOREIGN PATENT DOCUMENTS

CN   1268088 A    9/2000
CN   102232197 A  11/2011
(Continued)

OTHER PUBLICATIONS

European Patent Application No. 16191590.5; Extended Search Report; dated May 15, 2017; 7 pages.

*Primary Examiner* — Sang Nguyen
(74) *Attorney, Agent, or Firm* — Baker & Hostetler LLP (57) ABSTRACT

Embodiments of the invention disclose a vehicle guidance system, a method for orientating a vehicle, and an inspection vehicle. The vehicle guidance system includes at least two separate reference devices; a laser scanner device, configured to emit a laser beam signals and scan a sectorial region with the laser beam so as to measure a distance of a straight connection line for connecting the laser scanner device to any of the at least two separate reference devices, and an angle between the corresponding straight connection line and a vehicle body of the vehicle, or an angle between the straight connection lines; a processor, configured to process and store data, and to determine whether the orientation of the vehicle body in real time is deviating from an initial orientation of the vehicle body upon the system starts to operate or not, in accordance with the sensed results by the laser scanner device.

17 Claims, 2 Drawing Sheets

(51) Int. Cl.
*G01B 11/14* (2006.01)
*G05D 1/02* (2006.01)
*G01M 17/007* (2006.01)

(56) References Cited

U.S. PATENT DOCUMENTS

| | | | | |
|---|---|---|---|---|
| 5,943,476 | A * | 8/1999 | Dougherty | B25J 9/1694 700/251 |
| 6,404,509 | B1 * | 6/2002 | Kuwata | H04N 1/40006 358/1.9 |
| 6,418,370 | B1 * | 7/2002 | Isogai | B60K 31/0008 180/170 |
| 2006/0290920 | A1 * | 12/2006 | Kampchen | G01S 7/4972 356/139.04 |
| 2014/0046587 | A1 * | 2/2014 | Rintanen | G01S 7/4808 701/469 |
| 2014/0159925 | A1 * | 6/2014 | Mimeault | G01S 17/58 340/935 |
| 2014/0226789 | A1 * | 8/2014 | Bendahan | G01N 23/203 378/86 |

FOREIGN PATENT DOCUMENTS

| | | | | |
|---|---|---|---|---|
| CN | 205239401 U | 5/2016 | | |
| DE | 3930109 C1 | 11/1990 | | |
| DE | 102007058799 A1 | 6/2009 | | |
| EP | 0417665 A2 * | 3/1991 | ............ | G01S 17/06 |
| FR | 2495797 A | 6/1982 | | |
| KR | 10-0905694 B1 | 6/2009 | | |
| WO | WO 1998/059256 A2 | 12/1998 | | |
| WO | WO 2011/113482 A1 | 9/2011 | | |

* cited by examiner

VEHICLE GUIDANCE SYSTEM, METHOD FOR ORIENTATING VEHICLE, AND INSPECTION VEHICLE

CROSS-REFERENCE TO RELATED APPLICATION

This application claims the benefit of Chinese Patent Application No. 201511004616.7 filed on Dec. 29, 2015 in the State Intellectual Property Office of China, the disclosure of which is incorporated herein by reference.

TECHNICAL FIELD

The present application relates to a vehicle guidance system, a method for orientating a vehicle, and an inspection vehicle.

BACKGROUND OF THE INVENTION

Figure 1:
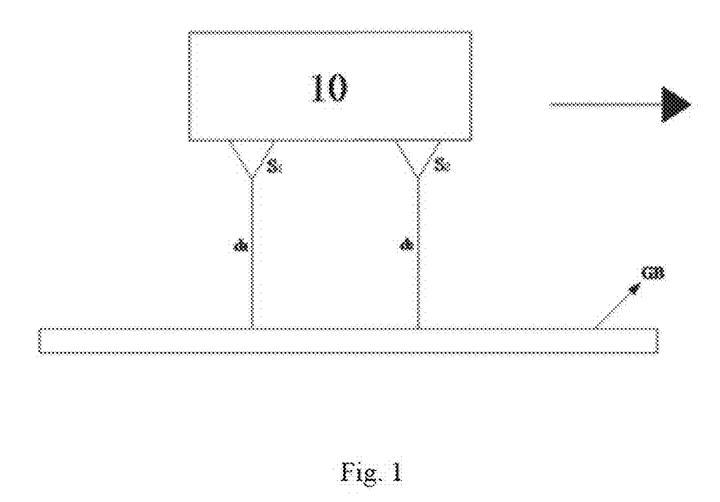
FIG. 1 shows a schematic plain view of an inspection vehicle in the prior art.

Currently, some special vehicles such as inspection vehicles need to perform guidance by their own. In general, as shown in FIG. 1, it needs to install a laser, two laser distance-measuring sensors and a set of reference baffles at one side of these vehicles. A vehicle 10' travels along a direction of an arrow. Before an initial guidance, it is necessary to set a distance between a vehicle body of the vehicle 10' and the reference baffle GB in advance. When the vehicle 10' for inspection is moving, in accordance with an output signal from the two sensors, different distances d1 and d2 between the vehicle for inspection and the reference baffle GB respectively can be obtained. Based on the relationship between the distances d1 and d2, a posture of the vehicle body is analyzed. When the distance d1 is not equal to the distance d2, i.e., an inclination degree of the vehicle body with respect to the reference baffle or a distance of the vehicle body transversely offset from an imaginary reference line exceeds a preset range, a correction system enables to adjust the posture of the vehicle body by means of an actuating mechanism, so that the vehicle body travels along a straight line parallel to the reference baffle, that is, the distance d1 is equal to the distance d2, or the distance d1 is close to the distance d2. When the inclination degree of the vehicle body with respect to the reference baffle or the distance of the vehicle body transversely offset from the imaginary reference line exceeds an adjustable range, the system will report an error for stopping the vehicle, to protect a scanning system therein to be safe.

However, in the prior art, it is normally necessary to install a certain length of the reference baffle. Due to different traveling distances for different inspection vehicles, the joined baffles will have a length from tens of meters up to a hundred of meters. After each translation of the location, these reference baffles need to be installed again, and it is not convenient to operate them on the spot. Since the reference baffles are huge bulky, and the transfer and transportation thereof are not convenient, it cannot efficiently satisfy needs of the inspection vehicles to frequently transfer from location to location. Such correcting way makes a relatively high demand on the producing process and installing precision of the reference baffles. That is, the surface of the baffles shall be flat and uniform. After joining the baffles, they shall be kept substantially in parallel to the predetermined travelling trace of the vehicle. Otherwise, it will result in a relatively large correction error.

SUMMARY

Embodiments of the present application provide a vehicle guidance system, which may overcome the existing defects of the system, and provide a more convenient vehicle guidance system.

In accordance with one aspect of the present application, there is provided a vehicle guidance system, comprising:

at least two separate reference devices, configured to serve as an orientation reference of a vehicle;

a laser scanner device, configured to emit laser beam and scan a sectorial region with the laser beam so as to measure a distance of a straight connection line for connecting the laser scanner device to any of the at least two separate reference devices, and an angle included between the corresponding straight connection line and a vehicle body of the vehicle, or an angle included between the straight connection lines;

a processor, configured to process and store data;

wherein the processor determines whether the orientation of the vehicle body in real time is deviating from an initial orientation of the vehicle body at the time when the system starts to operate or not, in accordance with distances of the straight connection lines from the laser scanner device to a first separate reference device and a second separate reference device of the at least two reference devices respectively, and an angle included between each of the straight connection lines and the vehicle body, or an angle included between the straight connection lines as sensed by the laser scanner device, wherein the initial orientation of the vehicle body is meant to an orientation of the vehicle body with respect to a straight connection line between the first separate reference device and the second separate reference device, as determined by the vehicle guidance system when the system starts to operate.

In accordance with another aspect of the present application, there is provided a method for orientating a vehicle, comprising:

using a laser scanner device of the vehicle to emit a plurality of laser beam signals towards at least two separate reference devices for scanning a sectorial region with the laser beam, so as to measure a distance of a straight connection line from any of the at least separate reference devices to the laser scanner device and an angle included between the straight connection line and a vehicle body of the vehicle, or an angle included between the straight connection lines;

determining whether real time orientation of the vehicle body deviates from an initial orientation of the vehicle body at the time when the system starts to work, based on measured distances of the straight connection lines from a first separate reference device and a second separate reference device of the at least two separate reference devices to the laser scanner device and the angle included between the straight connection lines and the vehicle body, or the angle included between the straight connection lines, wherein the initial orientation of the vehicle body is meant to an orientation of the vehicle body with respect to a straight connection line between the first and second separate reference devices, as determined by the vehicle guidance system when the system starts to operate.

In accordance with a further aspect of the present application, it provides an inspection vehicle for performing a security inspection of an object, comprising a vehicle guidance system as described above, wherein the laser scanner device is installed at a lateral side of the inspection vehicle.

DETAILED DESCRIPTION OF PREFERRED EMBODIMENTS

Figure 2:
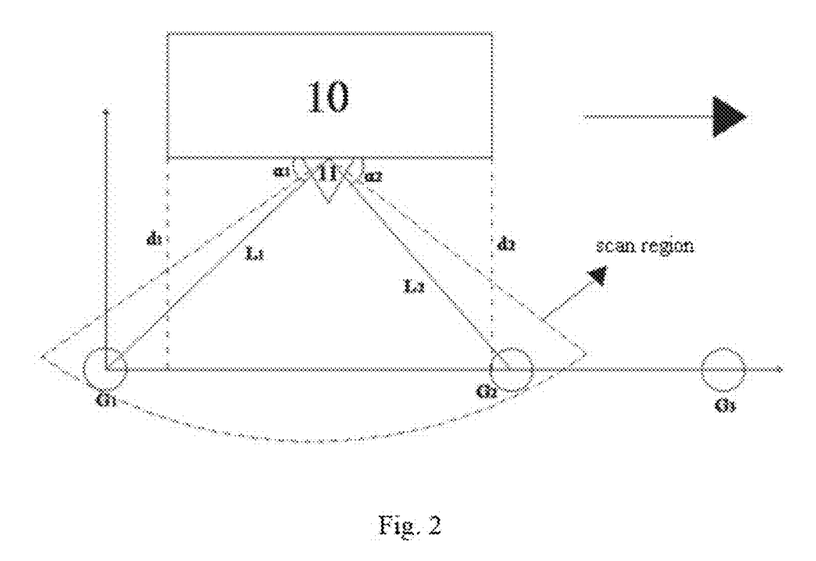
FIG. 2 shows a schematic plain view of an inspection vehicle according to the present application, in which a straight connection line among the reference devices orientates parallel to the initial body of the vehicle.

In accordance with one embodiment of the present application, as shown in FIG. 2, a vehicle guidance system includes: at least two separate reference devices for serving as an orientation reference of a vehicle 10; a laser scanner device 11, configured to emit a laser beam and scan a sectorial region with the laser beam so as to measure a distance of a straight connection line between the laser scanner device and any of the at least two separate reference devices, and an angle included between the corresponding straight connection line and the vehicle body of the vehicle; a processor, configured to process and store data. In the present embodiment, the processor determines whether the orientation of the vehicle body 10 in real time is deviating from an initial orientation of the vehicle body at the time when the system starts to operate or not, in accordance with the distances of the straight connection lines L1 and L2 from the laser scanner device 11 to a first separate reference device G1 and a second separate reference device G2 of the at least two reference devices respectively, and an angle $\alpha 1$, $\alpha 2$ included between each of the straight connection lines L1, L2 and the vehicle body 10, or an angle included between the straight connection lines L1 and L2 as sensed by the laser scanner device 11. The initial orientation of the vehicle body is meant to an orientation of the vehicle body 10 with respect to a straight connection line between the first separate reference device G1 and the second separate reference device G2, as determined by the vehicle guidance system when the system starts to operate.

FIG. 2 shows an embodiment of the present application. The vehicle body travels along a direction indicate by an arrow, and the initial orientation of the vehicle body is parallel to a straight connection line between the first separate reference device G1 and the second separate reference device G2.

In another embodiment of the present application, in order to facilitate the operation of the vehicle guidance system, a plurality of separate reference devices G1, G2, . . . Gn are arranged to enable the straight connection lines between all of the separate reference devices G1, G2, . . . Gn to be parallel to the initial orientation of the vehicle body.

Figure 3:
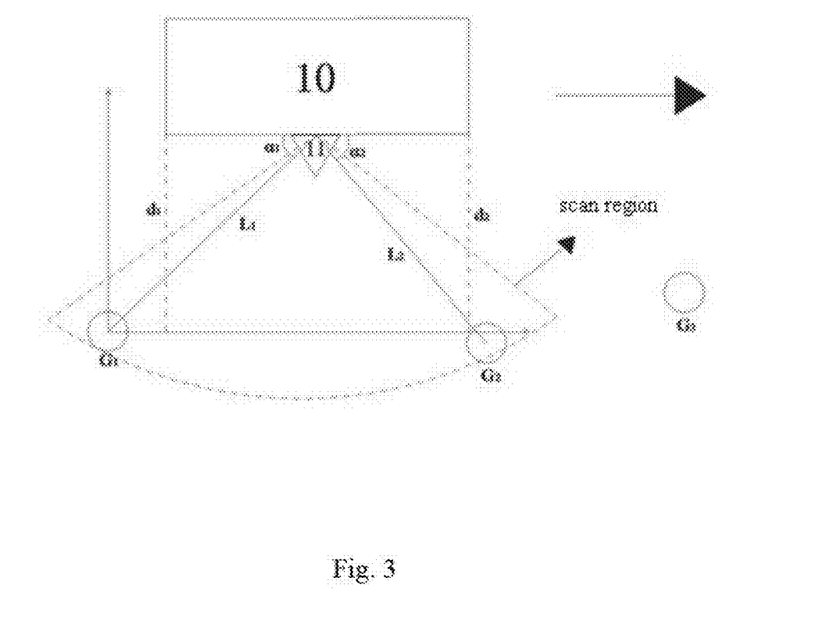
FIG. 3 shows a schematic plain view of an inspection vehicle according to the present application, in which a straight connection line among the reference devices orientates not parallel to the initial body of the vehicle.

FIG. 3 shows another embodiment of the present application. The vehicle body travels along a direction indicate by an arrow, and the initial orientation of the vehicle body is not parallel to a straight connection line between the first separate reference device G1 and the second separate reference device G2. In other words, the plurality of separate reference devices are arranged substantially along an extension direction or the travelling direction of the vehicle body. However, the straight connection line between the separate reference devices is not parallel to the initial orientation of the vehicle body. In practice, this can facilitate the operator to arrange the separate reference devices. Because it does not need any strict measurement upon arranging the separate reference devices, the separate reference devices can be arranged rapidly only by the feeling.

The laser scanner device can emit a laser beam, which can be used to scan within the sector region. Specifically, for example, the laser beam emitted in sequence scans from one side where a head of the vehicle body is located to another side where a tail of the vehicle body is located, so as to performing the scanning in a form of sector. A laser beam is emitted at intervals of a fixed angle, for example, 1 degree, 0.5 degree, or a smaller angle, so as to cover the region in the front of the vehicle body. In one embodiment of the present application, the laser beam is continuously emitted at an interval of 1 degree, so as to cover the sectorial form region or a central angle range of 180 degrees. Since the laser beam can be emitted in a sequence and reflected in an interval of a fixed angle, an angle of each of the laser beam with respect to the vehicle body can be determined based on the number of the laser beam. For example, when the laser beam are emitted in a way of an interval of 1 degree, if the laser beam is emitted at sixtieth times to illuminate the reference device, then an angle included between the straight connection line L1 or L2 from the laser scanner device to the reference device and the vehicle body is 60 degrees. In this way, the laser scanner device can measure lengths of the straight connection lines L1, L2 from the laser scanner device to the first reference device and the second reference device respectively, the angles included between the straight connection lines L1, L2 and the vehicle body respectively, or the angle included between the straight connection lines L1, L2. The working way of the laser scanner device can be applied into any of the embodiments of the present application. For sake of brief, a part of the embodiments of the present application do not repeatedly discuss the working way of the laser scanner device as described above. However, it should be understood that in each embodiment of the present application, the laser scanner device can work in such way as described above.

When the laser scanner device emits laser light and the scanning is performed within the sectorial region, the separate reference devices can be arranged relatively arbitrarily within a certain region, and there is no strict requirement on the spacing between the reference devices G1, G2, . . . Gn, as long as it can ensure at least two reference devices can be covered by this sectorial region. In accordance with the embodiment of the present application, the laser scanner device 11 receives data of the laser signal reflected by the reference device to be measured. Based on this data, the distances between the laser scanner device 11 and each of the reference devices G1, G2, . . . Gn can be measured and calculated, and an angle included between two laser beam can be calculated by distinguishing the interval (angle) between the two laser beam via the sensor. For example, as shown in FIG. 3, the laser scanner device 11 is fixed onto the vehicle body 10. Upon installing the sensor, it shall be kept to be parallel to the vehicle body by a mechanical limiting mechanism. The laser scanner device 11 can measure the lengths (distances) of the straight connection lines L1, L2 from the reference device to the sensor, and the angle $\alpha 1$ included between the straight connection line L1 from the laser scanner device 11 to the first reference device G1 and the vehicle body and the angle α2 included between the straight connection line L2 from the laser scanner device 11 to the second reference device G2 and the vehicle body can be determined by analyzing the angle interval and the reflected laser beam with respect to the vehicle body. According to the calculation formula about trigonometric function, vertical distances between the two reference devices and the vehicle body respectively can be calculated. In the present embodiment, the vertical distances from the vehicle body to the two reference devices respectively are different. In accordance with the embodiment of the present application, two separate reference devices or more than two separate reference devices can be used as the traveling distance varies. The vehicle guidance system in accordance with one embodiment of the present application can orientate the vehicle by using the separate reference devices which are arbitrarily arranged as shown in FIG. 3, which will be explained in detail below. It should be noted that the terms "first", "second", "third" and "fourth" used herein are intended to indicate different elements, rather than to limit the importance or arrangement sequence of the elements, or the positional relationship in space.

The vehicle guidance system in accordance with one embodiment of the present application is shown in FIG. 3, taken only two separate reference devices G1, G2 as an example for sake of simplified description. Before operation of the system, it can be initiated at first, i.e., "calibrating the reference". The processor reads back the corresponding distances of the straight connection lines L1, L2 from the laser scanner device 11 to the first separate reference device G1 and the second separate reference device G2 which are fixed, and calculates the angles α1, α2 included between the vehicle body and the straight connection lines L1, L2 respectively by analyzing the angle intervals of the reflected laser beam with respect to the vehicle body. According to the above known parameters, the system will establish a rectangular coordinate system in which the G1 is considered as an origin of coordinates, an imaginary line passing through the G1 and parallel to the vehicle body is considered as an X axis and another imaginary line which passes through the G1 and is vertical to the vehicle body is considered as a Y axis. The processor can calculate a positional coordinate of the reference point G2 and a positional coordinate of the sensor and save them. Such data are the calibration data. The vehicle guidance system in accordance with the embodiment of the present application constructs an imaginary rectangular coordinate system by using the data measured by the region laser sensor. Under such imaginary rectangular coordinate system, the positional coordinate of the initial origin G1, the positional coordinate of the region laser sensor and the positional coordinate of the adjacent reference device G2 to the reference device G1 where the origin is located are calibrated, and the controller stores the initiating information of the system. The person skilled in the art should appreciate that the positional coordinate of the initial origin G1, the positional coordinate of the region laser sensor and the positional coordinate of the adjacent reference device G2 to the reference device G1 where the origin is located are correlated with each other, and when the orientation of the vehicle body deviates, the X axis of the imaginary rectangular coordinate system will correspondingly change, and thus the imaginary rectangular coordinate system will change too. In other words, when the positional coordinates of the first reference device G1 and the second reference device G2 change, the imaginary rectangular coordinate system will change, because the first reference device and the second reference device are fixed in terms of position, and the imaginary rectangular coordinate system will change due to the change of the orientation of the vehicle body. In one embodiment of the present application, during the driving process, the vehicle guidance system determines the positional coordinates of the first separate reference device G1 and the second separate reference device G2 by measuring at any time point the distances of the straight connection line L1 from the laser scanner device 11 to the first separate reference device and the straight connection line L2 from the laser scanner device 11 to the second separate reference device respectively, the angles included between the straight connection lines L1, L2 and the vehicle body, or the angle included between the straight connection lines L1, L2. If the positional coordinates of the first separate reference device and the second separate reference device are kept constant, the orientation of the vehicle body is kept constant.

In another embodiment of the present application, during the driving process, the system will resolve out the real time coordinates of the laser scanner device 11, and obtain the real time orientation and positions of the vehicle body by comparing each of them with the calibration coordinate and analyzing and calculating the comparison results. When the orientation of vehicle body is located at a certain range of the threshold, the traveling trace of the vehicle body will substantially coincide with the X axis of the reference coordinate system. And then, the direction of the driving will not be adjusted, a steering wheel will be in a state of return and the vehicle body will travel along the original direction. When the travelling trace deviates from a direction of the X axis of the reference coordinate system, the system will control the adjusting degree of the steering wheel, based on the deviating direction and deviation degree of the vehicle body. Meanwhile, the adjusting information will be fed back so that the entire vehicle guidance system is within a closed-cycle control. This enables to adjust the travelling direction more precisely, thereby adjusting the posture and position of the vehicle body.

Figure 4:
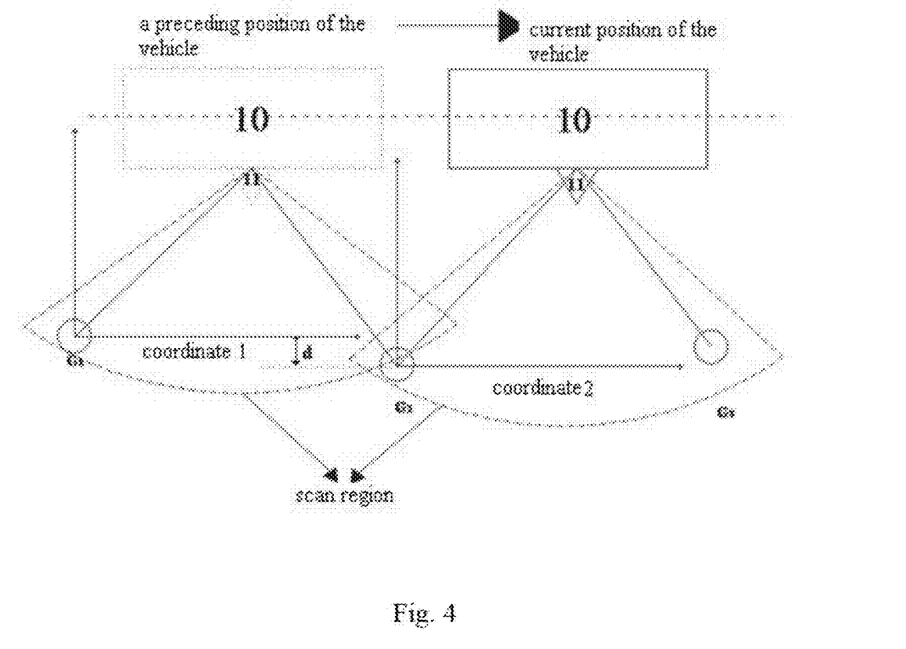
FIG. 4 shows a schematic plain view of an inspection vehicle at different time points according to the present application, during an operation of which a relay of the reference devices is finished.

As for the vehicle guidance system in accordance with the embodiment of the present application, when the system starts to work, the processor determines and stores the angles α1, α2 respectively included between the initial imaginary line and the connection lines between the first separate reference device G1 and the second separate reference device G2, and calculates the vertical distances of the vehicle head and the tail of the vehicle from the reference line respectively by an algorithm. FIG. 4 shows a case that the connection line between the two reference devices is not parallel to the vehicle body at the beginning (the vehicle travels along the direction indicated by the arrow). In this case, the imaginary line extending through G1 and parallel to the direction of the vehicle body does not coincide with another imaginary line extending through G2 and parallel to the direction of the vehicle body, that is, in the coordinate system in which the G1 is considered as the origin, the G1 and G2 have different longitudinal coordinates. In accordance with the embodiment of the present application, when the system is initially calibrated, the processor records the coordinates of the reference points adjacent to the origin, i.e., the positional coordinate of the point G1 is (0, 0), and the positional coordinate of the point G2 is (Δx,Δy), while the Δy is not zero. When analyzing the distances of the head and tail of the vehicle from the reference line, an offset amount Δy of the point G2 with respect to the point G1 is compensated by the algorithm. In this way, it ensures that during the traveling process, the vehicle body always keeps travelling along the X axis at a fixed distance from the imaginary line which extends through the G1 and is parallel to the direction of the vehicle body, that is, the vehicle body always keeps travelling along the X axis with the distance between the G1 and the vehicle body when the vehicle body is calibrated.

Since the imaginary reference coordinate system is determined, during the traveling process of the vehicle 10, it is possible to determine whether the vehicle 10 deviates from the initial direction or not based on the imaginary reference coordinate system. In one embodiment, during the travelling process of the vehicle 10, the real time positional coordinate of the sensor in the imaginary reference coordinate system can be determined by measuring the real time distances of the straight connection lines L1, L2 from the laser scanner device 11 to the first separate reference device G1 and the second separate reference device G2 respectively, and the real time angles included between the straight connection lines L1, L2 and the vehicle body respectively via the laser scanner device 11. The positional coordinates of the head and the tail are calculated based on the real time position ($\alpha 1$, $\alpha 2$) where the sensor is located within the vehicle body and thus the distances of the position ($\alpha 1$, $\alpha 2$) from the head and the tail of the vehicle respectively, thereby calculating the posture and the position of the vehicle body. The real time position of the vehicle 10 is compared with the initial calibrated position, so as to determine the deviation direction and the offset amount of the vehicle body.

In accordance with the embodiment of the present application, when the travelling distance is very long, as the vehicle 10 continuously travels, the laser scanner device 11 becomes more and more far away from the first and second separate reference devices, at this time, it is possible to provide a third, a fourth or more reference devices to continue the operation of guiding the vehicle. In other words, the vehicle guidance system includes a plurality of reference devices, which can enable the sectorial region scanned with the laser scanner device 11 to cover two reference devices, so as to perform the guidance of the vehicle, and continue the process of guiding the vehicle as the vehicle moves. When the reference goes out of the range covered by the sectorial scanning region of the laser scanner device 11, the system will lose the supply of the measuring data. At this time, it is necessary to add a new reference, and the extension of the reference devices will be achieved by the means of relaying the reference devices, thereby lengthening the navigation path of the system to the vehicle body. As shown in FIG. 4, the present embodiment of the present application provides a third separate reference device. When the traveling distance of the vehicle 10 is increasing up, the number of the separate reference devices can be added continuously. In accordance with an embodiment of the present application, the working principle for guiding the vehicle with the second separate reference device and the third separate reference device is identical with that with the first reference device and the second reference device as described above.

In one embodiment of the present application, when the vehicle 10 travels a certain distance, the system will determine the laser scanner device 11 has been far away from the first separate reference device and the second separate reference device. At this time, it shall make a relay, so as to use the second separate reference device and the third separate reference device as the currently used two reference points, thereby ensuring the reliability of the data. The laser scanner device 11 continues to work in the way as described above. By the distances of the straight connection lines from the laser scanner device 11 to the second separate reference device G2 and the third separate reference device G3 respectively, and the angles included between the vehicle body and the straight connection lines, the processor establishes an coordinate system in which the point G2 is considered as an origin, and an imaginary line extending through the point G2 and parallel to the direction of the vehicle body at the initial time is considered as an X axis. Based on the coordinate values of the G2 measured under the reference system in which the G2 is used as the origin, the coordinate of the laser scanner device 11 under the coordinate system in which the G2 is used the origin thereof will be corrected once, so as to ensure under different coordinate systems, the coordinates for the same position of the vehicle body will be calculated to be identical. Meanwhile, the real time posture and position of the vehicle body calculated under this coordinate system will be saved. In this way, one relay is made, and subsequently the relay will be continued as the traveling distance of the vehicle body increases.

After the vehicle body finishes a single travel along the same direction, when the vehicle body travels along an opposite direction, the system will implement measurement, and invoke the coordinate information of the reference device during traveling forward so as to perform matching with the position of the vehicle body during traveling forward, thereby eliminating the accumulation of the error to the greatest extent.

In another embodiment of the present application, when the vehicle guidance system guides the vehicle by using the second separate reference device G2 and the third separate reference device G3 again, an transient state of the vehicle body is used an initial state, and an imaginary rectangular coordinate system in which the second separate reference device G2 is considered as the origin can be determined in a way similar to the process of using the first and second separate reference devices G1 and G2 as described above, and thereby the coordinates of the second and third separate reference devices G2 and G3 as well as the laser scanner device 11, are calculated under the new imaginary rectangular coordinate system in which the second separate reference device G2 is considered as the origin. In other words, the vehicle can also be guided independent of the parameters within the rectangular coordinate system in which the first separate reference device G1 is used as the origin. Meanwhile, the real time posture and position of the vehicle body calculated under this coordinate system will be saved. In this way, one relay is made by such algorithm, and the subsequent relay will be continued as the traveling distance of the vehicle body increases. After the vehicle body finishes a single travel along the same direction, when the vehicle body travels along an opposite direction, the system will invoke the coordinate information of the reference device or point during traveling forward to perform matching with the position of the vehicle body during traveling forward based on the algorithm detection, thereby eliminating the accumulation of the error to the greatest extent.

In accordance with the embodiment of the present application, the initial orientation of the vehicle body used herein is not limited to the orientation of the vehicle body when the vehicle starts to move initially. It shall be understood from the above description that the initial orientation of the vehicle body can be the orientation of the vehicle body at any time point. When the orientation of the vehicle body at a certain time point is used as the initial orientation, the vehicle guidance system can measure the subsequent orientation of the vehicle body and adjust or control the orientation of the vehicle body. Therefore, it can be understood that the vehicle guidance system of the present embodiment can measure whether the orientation of the vehicle body at the next time point deviates from the orientation of the vehicle body at the preceding time point.

In one embodiment of the present application, there is provided a method for orientating a vehicle, including the steps of: using a laser scanner device 11 of the vehicle to emit a plurality of laser beam signals towards at least two separate reference devices for scanning a sectorial region with the laser beam, so as to measure the distance of the straight connection line from any of the at least two separate reference devices to the laser scanner device 11 and the angle included between the straight connection line and the vehicle body, or the angle included between the straight connection lines. The method also includes determining whether real time orientation of the vehicle body 10 deviates from the initial orientation of the vehicle body when the system starts to work, based on the measured distances of the straight connection lines L1, L2 from the first separate reference device G1 and the second separate reference device G2 of the at least separate reference devices to the laser scanner device 11 and the angle between the straight connection lines L1, L2 and the vehicle body, or the angle between the straight connection lines L1, L2. The initial orientation of the vehicle body is meant to the orientation of the vehicle body 10 with respect to the straight connection lines of the first and second separate reference devices G1, G2, as determined by the vehicle guidance system when the system starts to work.

Specifically, when the system starts to work, the processor will determine and store the initial orientation of the vehicle body based on the distances of the straight connection lines L1, L2 from the first separate reference device G1 and the second separate reference device G2 to the laser scanner device 11 respectively and the angle included between the straight connection lines L1, L2 and the vehicle body 10, or the angle included between the straight connection lines L1, L2, as measured by the laser scanner device 11; and thereby determine the positional coordinates of the second separate reference device and laser scanner device within the rectangular coordinate system in which the first separate reference device G1 is used as the origin, wherein one axis of the rectangular coordinate system is parallel to the initial orientation of the vehicle body 10.

The laser scanner device 11 emits the laser beam in sequence at a certain angle interval, so as to determine the angle of each emitted laser beam with respect to the vehicle body 10, thereby determining the angle determined between the laser beam reflected by the reference device and the vehicle body 10.

In one embodiment of the present application, the positional coordinates of the first separate reference device and the second separate reference device are determined by measuring at any time point the distances of the straight connection line L1 from the laser scanner device 11 to the first separate reference device G1 and the straight connection line L2 from the laser scanner device 11 to the second separate reference device G2, the angles included between the straight connection lines L1, L2 and the vehicle body, or the angle included between the straight connection lines L1, L2. If the positional coordinates of the first separate reference device and the second separate reference device keep to be constant, the orientation of the vehicle body does not change.

In another embodiment of the present application, the method for orientating a vehicle includes: determining the real time coordinates of the laser scanner device 11 by measuring at any time point the distances of the straight connection line L1 from the laser scanner device 11 to the first separate reference device G1 and the straight connection line L2 from the laser scanner device 11 to the second separate reference device G2, the angles included between the straight connection lines L1, L2 and the vehicle body, or the angle included between the straight connection lines L1, L2, thereby obtaining the real time orientation and positions of the vehicle body 10.

In another embodiment of the present application, the method for orientating the vehicle includes: providing a third reference device, and the vehicle guidance system determine whether the real time orientation of the vehicle body 10 deviates from the initial orientation of the vehicle body based on the distances of the straight connection line from the laser scanner device 11 to the third separate reference device G3 and the straight connection line from the laser scanner device 11 to the second separate reference device G2 respectively, the angles included between the straight connection lines and the vehicle body, or the angle included between the straight connection lines, as sensed by the laser scanner device 11.

In another embodiment of the present application, the method for orientating the vehicle includes: providing a plurality of reference devices, and guiding the vehicle 10 by using two of the reference devices which are covered by a sectorial region scanned by the laser scanner device 11, thereby continuously performing the process for guiding the vehicle.

In one embodiment of the present application, an inspection vehicle 10 for performing a security inspection of an object, including the vehicle guidance system as described above, wherein the laser scanner device 11 is installed at a lateral side of the inspection vehicle 10.

As compared with the reference baffle, a plurality of separate reference devices is provided, so as to significantly reduce the time for installing and adjusting them. The number of the separate reference devices can be flexibly selected, the volume thereof is smaller, and they can be transported conveniently, so that they can meet the requirement for translating the vehicle between different locations. There are no high installing precision for the separate reference devices. For example, even if two cylindrical reference devices are not strictly installed in accordance with an imaginary reference line, the relative error can be calculated. In this way, taking account of the relative error, the position and posture of the vehicle body can be recognized.

What is claimed is:

1. A vehicle guidance system, comprising:
   at least two separate reference devices, configured to serve as an orientation reference of a vehicle;
   a laser scanner device, configured to emit a laser beam and scan a sectorial region with the laser beam so as to measure a distance of a straight connection line for connecting the laser scanner device to any of the at least two separate reference devices, and an angle included between the corresponding straight connection line and a vehicle body of the vehicle, or an angle included between the straight connection lines;
   a processor, configured to process and store data;
   wherein the processor determines whether the orientation of the vehicle body in real time is deviating from an initial orientation of the vehicle body at the time when the system starts to operate or not, in accordance with distances of the straight connection lines from the laser scanner device to a first separate reference device and a second separate reference device of the at least two reference devices respectively, and an angle included between each of the straight connection lines and the vehicle body, or an angle included between the straight connection lines as sensed by the laser scanner device, wherein the initial orientation of the vehicle body is an orientation of the vehicle body with respect to a straight connection line between the first separate reference device and the second separate reference device, as determined by the vehicle guidance system when the system starts to operate.

2. The vehicle guidance system according to claim 1, wherein the processor is configured:
to determine and save the initial orientation of the vehicle body when the system starts to operate, on the basis of the distances of the straight connection lines from the laser scanner device to the first separate reference device and the second separate reference device respectively, and the angle included between each of the straight connection lines and the vehicle body, or the angle included between the straight connection lines measured by the laser scanner device;
to establish a rectangular coordinate system with the first separate reference device as an origin of coordinate; and
to determine positional coordinates of the second separate reference device and the laser scanner device, wherein an axis of the rectangular coordinate system is parallel to the initial orientation of the vehicle body of the vehicle.

3. The vehicle guidance system according to claim 2, wherein the vehicle guidance system determines the positional coordinates of the first separate reference device and the second separate reference device by at any time point measuring the distances of the straight connection lines from the laser scanner device to the first separate reference device and the second separate reference device respectively, and the angle included between each of the straight connection lines and the vehicle body, or the angle included between the straight connection lines; and, if the positional coordinates of the first separate reference device and the second separate reference device keep to be constant, the orientation of the vehicle body does not change.

4. The vehicle guidance system according to claim 2, wherein the vehicle guidance system determines real time coordinates of the laser scanner device by at any time point measuring the distances of the straight connection lines from the laser scanner device to the first separate reference device and the second separate reference device respectively, and the angle included between each of the straight connection lines and the vehicle body, or the angle included between the straight connection lines, thereby obtaining a real time orientation and positions of the vehicle body.

5. The vehicle guidance system according to claim 2, wherein the vehicle guidance system further comprises a third reference device, and determines whether the real time orientation of the vehicle body is deviating from the initial orientation of the vehicle body or not, on the basis of distances of straight connection lines from the laser scanner device to the third reference device and the second reference device respectively, and an angle included between each of the straight connection lines and the vehicle body, or an angle included between the straight connection lines as sensed by the laser scanner device.

6. The vehicle guidance system according to claim 5, wherein the vehicle guidance system comprises a plurality of reference devices, and enables to guide the vehicle by using two of the plurality of reference devices which are covered by the sectorial region scanned by the laser scanner device, and to continuously perform the process for guiding the vehicle as the vehicle moves.

7. The vehicle guidance system according to claim 1, wherein the laser scanner device is capable to determine an angle of each emitted laser beam with respect to the vehicle body by the laser beam which are emitted in sequence at a certain angle interval, so that the angle determined between the laser beam reflected by the reference device and the vehicle body is determined.

8. The vehicle guidance system according to claim 1, wherein the laser scanner device is fixed onto the vehicle body at a known angle with respect to the vehicle body, and the laser scanner device comprises a laser emitter and a sensor.

9. An inspection vehicle for performing a security inspection of an object, comprising a vehicle guidance system as claimed in claim 1, wherein the laser scanner device is installed at a lateral side of the inspection vehicle.

10. A method for orientating a vehicle, comprising:
using a laser scanner device of the vehicle to emit laser beams towards at least two separate reference devices for scanning a sectorial region with the laser beam, so as to measure a distance of a straight connection line from any of the at least separate reference devices to the laser scanner device and an angle included between the straight connection line and a vehicle body of the vehicle, or an angle included between the straight connection lines;
determining whether real time orientation of the vehicle body deviates from an initial orientation of the vehicle body at the time when the system starts to work, based on measured distances of the straight connection lines from a first separate reference device and a second separate reference device of the at least two separate reference devices to the laser scanner device and the angle included between the straight connection lines and the vehicle body, or the angle included between the straight connection lines, wherein the initial orientation of the vehicle body is meant to an orientation of the vehicle body with respect to a straight connection line between the first and second separate reference devices, as determined by the vehicle guidance system when the system starts to operate.

11. The method according to claim 10, further comprising: when the system starts to operate, the processor is configured:
to determine and save the initial orientation of the vehicle body, on the basis of the distances of the straight connection lines from the laser scanner device to the first separate reference device and the second separate reference device respectively, and the angle included between each of the straight connection lines and the vehicle body, or the angle included between the straight connection lines measured by the laser scanner device;
to establish a rectangular coordinate system with the first separate reference device as an origin of coordinate; and
to determine positional coordinates of the second separate reference device and the laser scanner device, wherein an axis of the rectangular coordinate system is parallel to the initial orientation of the vehicle body of the vehicle.

12. The method according to claim 11, wherein the laser scanner device is capable to determine an angle of each emitted laser beam with respect to the vehicle body by the laser beam which are emitted in sequence at a certain angle interval, so that the angle determined between the laser beam reflected by the reference device and the vehicle body is determined.

13. The method according to claim 11, further comprising determining positional coordinates of the first separate reference device and the second separate reference device by at any time point measuring the distances of the straight connection lines from the laser scanner device to the first separate reference device and the second separate reference device respectively, and the angle included between each of the straight connection lines and the vehicle body, or the angle included between the straight connection lines; when the positional coordinates of the first separate reference device and the second separate reference device keep to be constant, the orientation of the vehicle body does not change.

14. The method according to claim 11, further comprising determining real time coordinates of the laser scanner device by at any time point measuring the distances of the straight connection lines from the laser scanner device to the first separate reference device and the second separate reference device respectively, and the angle included between each of the straight connection lines and the vehicle body, or the angle included between the straight connection lines, thereby obtaining a real time orientation and positions of the vehicle body.

15. The method according to claim 11, further comprising providing a third reference device, and the vehicle guidance system determines whether the real time orientation of the vehicle body is deviating from the initial orientation of the vehicle body or not, on the basis of distances of straight connection lines from the laser scanner device to the third reference device and the second reference device respectively, and an angle included between each of the straight connection lines and the vehicle body, or an angle included between the straight connection lines as sensed by the laser scanner device.

16. The method according to claim 15, further comprising a plurality of reference devices, and guiding the vehicle by using two of the plurality of reference devices which are covered by the sectorial region scanned by the laser scanner device, thereby continuously performing the process for guiding the vehicle as the vehicle moves.

17. The method according to claim 10, wherein the laser scanner device is fixed onto the vehicle body at a known angle with respect to the vehicle body, and the laser scanner device comprises a laser emitter and a sensor.

* * * * *